US008256553B2

(12) United States Patent
De Paschoal

(10) Patent No.: US 8,256,553 B2
(45) Date of Patent: Sep. 4, 2012

(54) ELECTRIC VEHICLES

(76) Inventor: Roberto De Paschoal, Toronto (CA)

( * ) Notice: Subject to any disclaimer, the term of this patent is extended or adjusted under 35 U.S.C. 154(b) by 0 days.

(21) Appl. No.: 12/910,928

(22) Filed: Oct. 25, 2010

(65) Prior Publication Data

US 2011/0198137 A1 Aug. 18, 2011

Related U.S. Application Data

(60) Provisional application No. 61/305,470, filed on Feb. 17, 2010.

(51) Int. Cl.
*B60R 16/04* (2006.01)
(52) U.S. Cl. ...................................... 180/68.5; 180/65.1
(58) Field of Classification Search .................. 180/65.1, 180/68.5
See application file for complete search history.

(56) References Cited

U.S. PATENT DOCUMENTS

| | | | | |
|---|---|---|---|---|
| 3,838,745 | A * | 10/1974 | Kappei | 180/68.5 |
| 3,930,552 | A * | 1/1976 | Kunkle et al. | 180/68.5 |
| 3,983,952 | A * | 10/1976 | McKee | 280/778 |
| 4,090,578 | A | 5/1978 | Shinoda et al. | |
| 5,373,910 | A * | 12/1994 | Nixon | 180/65.1 |
| 5,542,488 | A * | 8/1996 | Nixon | 180/65.1 |
| 5,585,205 | A * | 12/1996 | Kohchi | 429/99 |
| 5,760,569 | A * | 6/1998 | Chase, Jr. | 320/104 |
| 5,951,229 | A * | 9/1999 | Hammerslag | 414/398 |
| 6,085,854 | A * | 7/2000 | Nishikawa | 180/68.5 |
| 6,189,636 | B1 * | 2/2001 | Kikukawa | 180/68.5 |
| 6,357,070 | B1 * | 3/2002 | Venard et al. | 15/50.1 |
| 7,201,384 | B2 * | 4/2007 | Chaney | 180/68.5 |
| 7,520,355 | B2 * | 4/2009 | Chaney | 180/68.5 |
| 2004/0035617 | A1 * | 2/2004 | Chaney | 180/65.1 |
| 2004/0135358 | A1 | 7/2004 | Szymanski | |
| 2005/0274556 | A1 * | 12/2005 | Chaney | 180/68.5 |
| 2008/0006459 | A1 * | 1/2008 | Niebuhr | 180/68.5 |
| 2008/0314662 | A1 * | 12/2008 | Bogelein et al. | 180/68.5 |
| 2010/0025132 | A1 * | 2/2010 | Hill et al. | 180/65.29 |
| 2010/0147604 | A1 * | 6/2010 | Sakita | 180/65.1 |

FOREIGN PATENT DOCUMENTS

| | | |
|---|---|---|
| CA | 2274370 A1 | 11/2000 |
| CA | 2274423 A1 | 11/2000 |

OTHER PUBLICATIONS

General Motors Hy-wire <http://en.wikipedia.org/wiki/General_Motors_Hy-wire>.
How GMs Hy-wire Works <http://www.howstuffworks.com/hy-wire.htm/printable>.
Better Place <http://www.betterplace.com/the-solution-batteries>.
Better Place <http://www.betterplace.com/the-solution-switch-stations>.

* cited by examiner

*Primary Examiner* — J. Allen Shriver, II
*Assistant Examiner* — Travis Coolman
(74) *Attorney, Agent, or Firm* — Smiths IP

(57) ABSTRACT

An electric vehicle includes a chassis and a compartment defined by the chassis. A power container houses at least one energy storage/generating device for powering the electric vehicle. The power container is insertable into and removable from the compartment through the left side and the right side of the chassis. A suspension apparatus includes a shaft, a control arm pivotably connected to the shaft, at least one helical torsion spring mounted on the shaft, and a linear actuator. Movement of the linear actuator increases bending stress on the at least one helical torsion spring and urges the control arm downwardly.

17 Claims, 13 Drawing Sheets

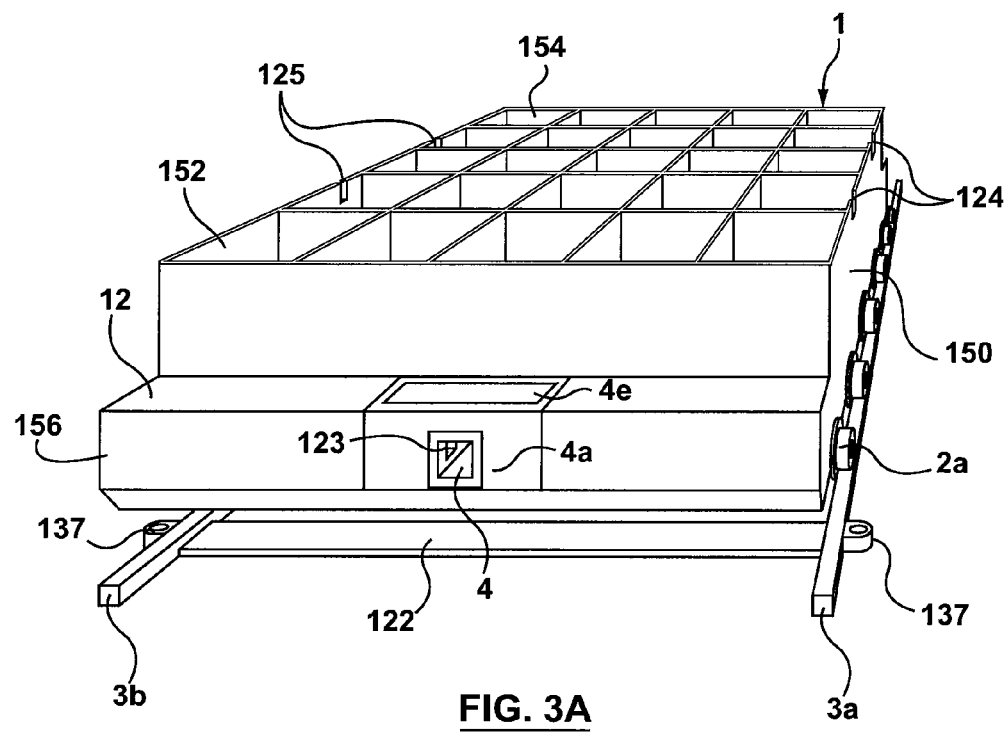
FIG. 3A
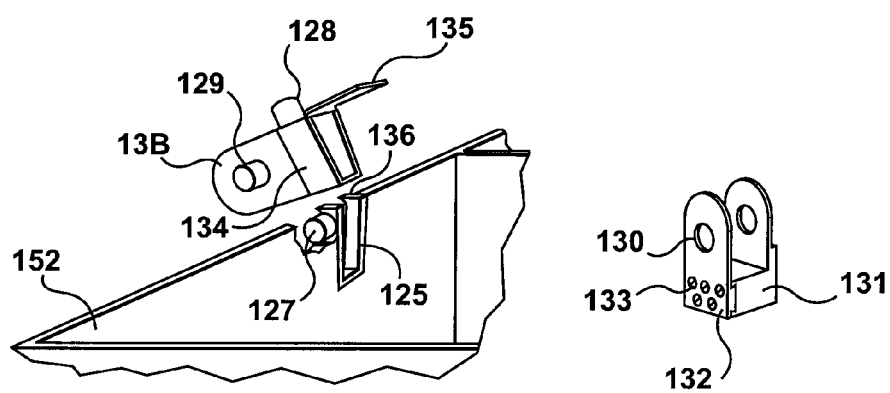
FIG. 3B
FIG. 3C

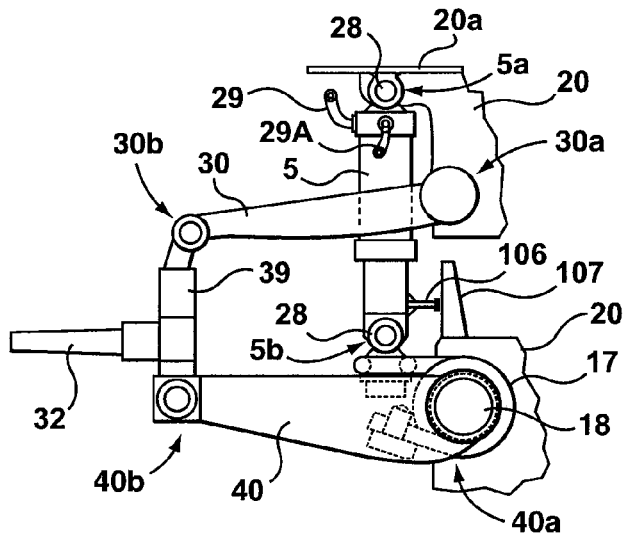
FIG. 8
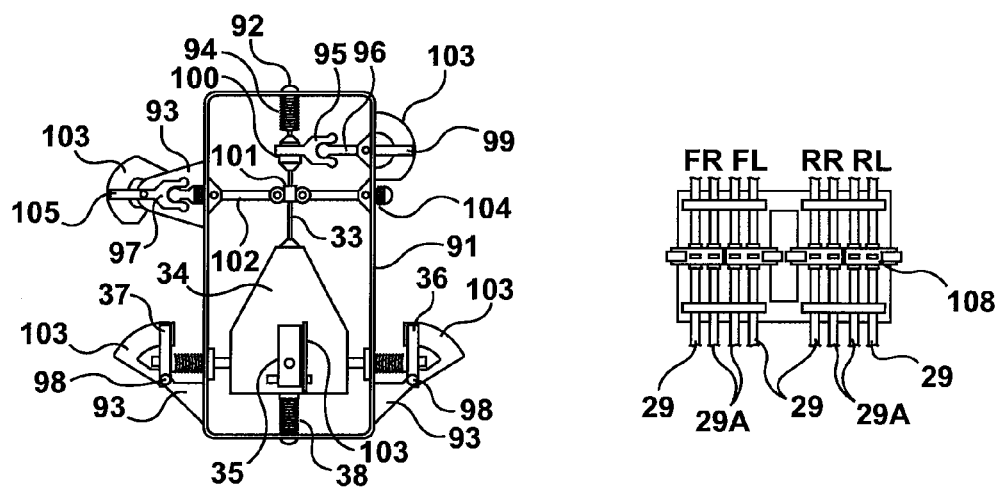
FIG. 9
FIG. 9A

ELECTRIC VEHICLES

CROSS REFERENCE TO RELATED APPLICATION

This application claims the benefit of U.S. Application No. 61/305,470 filed Feb. 17, 2010, which is hereby incorporated herein by reference in its entirety.

FIELD

This specification relates to electric vehicles, power supplies for electric vehicles, and to methods for providing charged power supplies in an electric vehicle. This specification also relates to vehicle suspension apparatuses.

BACKGROUND

An electric vehicle is a vehicle that uses one or more electric motors for propulsion. Electric vehicles were first developed in the 19th century, when electricity provided a level of comfort and ease of operation that was superior to that of gasoline cars of the time. The internal combustion engine has become the main propulsion mechanism for automobiles, but electric power has remained common in other vehicle types, such as trains, streetcars, and forklifts.

Recently, concern over the environmental impact of fossil fuel-based transportation infrastructure has led to greater interest in electric vehicles. Electric vehicles differ from fossil fuel-powered vehicles in that the electricity they consume may be generated from a variety of sources, including fossil fuels, nuclear power, and renewable sources such as solar power, wind power, tidal power, geothermal power, or a combination thereof. Electrical energy may be transmitted to electrical vehicles through use of overhead lines, or a direct connection using an electrical cable. The electricity may then be stored onboard the vehicle using a battery.

INTRODUCTION

The following discussion is intended to introduce the reader to the more detailed discussion to follow, and not to limit or define any claim.

The teachings herein may provide for various electric vehicles having competitive safety, performance, comfort and affordability, as well as addressing recharging issues and travel range limits of battery packs.

In some examples, the electric vehicles described herein have been designed with the ability of being propelled by an economically feasible energy storage system: the advanced lead-acid battery. A plurality of batteries may be stored in a power container. The electric vehicles may be structured for bearing the weight of the power container, and capable of having the power container with depleted batteries swapped with a power container having fully charged batteries, in a matter of seconds at a dedicated recharging station. This versatility may also allow the electric vehicles to enjoy advantages of other kinds of advanced batteries, fuel cell stacks, super capacitors, etc. Adjustable suspension apparatuses may adjust to account for differences in weight of the power containers.

In some examples, the electric vehicles described herein may be equipped with devices to collect electricity from a dedicated highway lane and travel normally even without power from batteries or another energy storage/generating device. However, its batteries, if any onboard in the power container, may be recharged during the trip on those lanes.

The five-passenger, eight-feet long, for example, electric vehicles described herein may have other advantages, as described in further detail below.

In some examples, the electric vehicles described herein may have a unique architecture with the passenger's cabin built entirely over the chassis, which comprises the wheels, axles, bumpers, suspension, brakes, electric motor(s), steering systems, etc.

In some examples, in between the wheels and sitting at about the ground clearance level of the electric vehicle, stands a box-like power container filled with interconnected batteries or equivalent energy storage and/or generating devices. The power container may have in-line wheels on both sides, sitting on rails installed on the chassis, running transversely across the width of the vehicle. Whenever the power container needs to be recharged, the vehicle may be driven to a swapping station, the rails aligned with the ones of the swapping station, the onboard locking mechanism released, and then a similar power container filled with freshly charged batteries may be rolled in and simultaneously push the depleted power container out, out of the opposite side of the vehicle. The depleted power container may then be recharged at the swapping station. As the freshly charged one arrives inside the vehicle, the locking/connecting mechanism may travel back to the "lock" position, and the vehicle is ready for further travel. The entire operation may take no more than a couple of seconds. The same idea may also be applied to other OEM or converted electric vehicles and/or trailers for them to enjoy the same switching capability.

In some examples, the electric vehicles described herein may reduce "range" anxiety—if a vehicle is stranded in a remote location without power, a service provider may be called equipped with a transporting apparatus, as described below, which has a mechanism capable of extracting the power container with depleted batteries, and provide a similar power container having charged batteries. The vehicle may be on its way again in just a few minutes after the switching session.

In some examples, the electric vehicles described herein may include an electrical energy pick-up coil installed under the vehicle that may also be used to collect electricity wirelessly from live wiring embedded under the pavement, and if a ground connection is necessary, a device with a roller running on a metal guiding-rail laid onto the pavement may be used. The arrangement may be also used to guide the steering system of the vehicle at various speeds, thus, giving it an "auto-pilot" mode capability. In order to save money on highway infrastructure, another option of a self-guidance system involves use of an onboard metal detector probe device connected to the steering mechanism, to monitor the pathway of embedded segments of rods, wire ropes or even spikes spaced along the predetermined path of travel of the vehicle, embedded on or under the pavement.

In some examples, the electric vehicles described herein may have a steering system that may give it the ability to spin about its own vertical axis (thus providing a zero turning radius) by making all four wheels rotate about respective wheel axes and rotating the wheels on one side in opposite direction of the ones of the other side of the automobile.

In some examples, the electric vehicles described herein may have a platform flexible enough to have even its cabin interchanged, and become another segment of vehicle altogether, e.g., a mini-truck, van, a small towing rig, etc., plus a transit vehicle where passengers may sit back-to-back and enter or exit through front and rear gates. These vehicles may be used on a convoy basis, in which they communicate wirelessly with each other, thus creating a modular transit system with advantages in costs of acquisition, operation and maintenance, maneuverability, flexibility of size, accessibility of passengers, etc. These vehicles may also have the same zero turning radius steering capability, as well as other features of the electric vehicles, including power container swapping.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. In the drawings:

FIG. 1 is a partial side view of an electric vehicle;

FIG. 2A a partial upper view of the electric vehicle of FIG. 1, showing the chassis;

FIG. 3A is a perspective view of a power container of the electric vehicle of FIG. 1, configured to house at least one energy storage/generating device, shown supported on rails;

FIG. 3B is a detailed perspective view showing a locking latch used in combination with the power container of FIG. 3A;

FIG. 3C is a perspective view showing a support bracket for the locking latch of FIG. 3B;

FIG. 8 is a partial front view of a suspension apparatus for the front, right wheel of the electric vehicle of FIG. 1;

FIG. 9 shows a sensor apparatus of the electric vehicle of FIG. 1;

FIG. 9A shows a hydraulic flow control module for use in combination with the sensor apparatus of FIG. 9;

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

Figure 1:
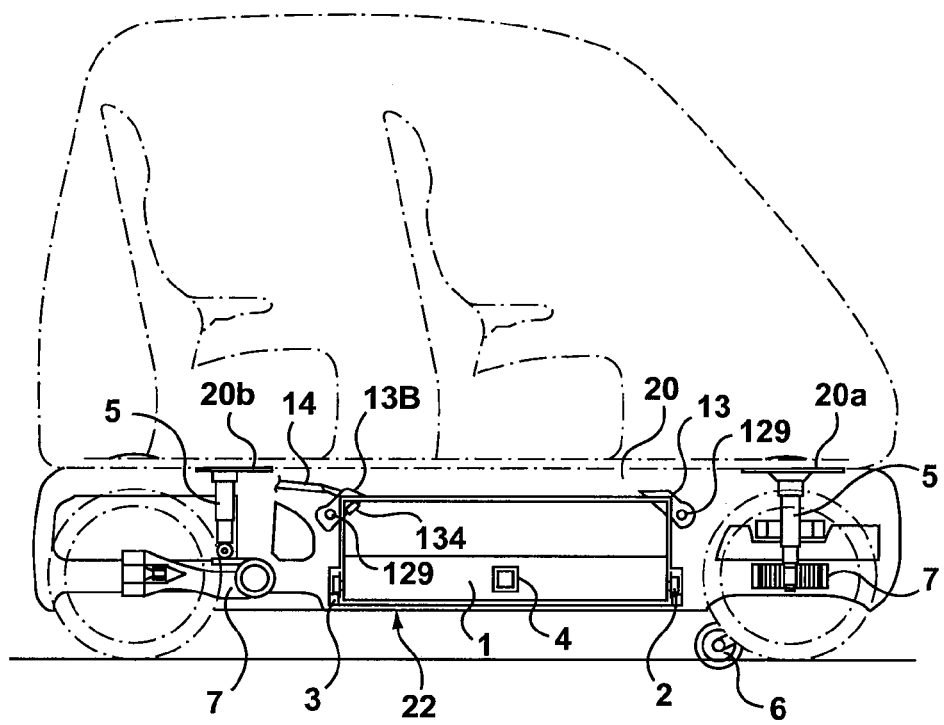

FIG. 1 is a partial side view of an example of an electric vehicle, showing hardware installed on chassis 20 that allows battery switching capabilities, as well as other features. Compartment 22 is defined by chassis 20, and may be accessible through either side of the electric vehicle. Power container 1 houses at least one energy storage/generating device for powering the electric vehicle. For example, power container 1 may be filled with a plurality interconnected batteries. Power container 1 is insertable into and removable from compartment 22. Thus, a first power container 1 housing a depleted energy storage/generating device may be removed from the compartment 22, and a second power container 1 housing a charged energy storage/generating device may then be inserted into the compartment 22. Power container 1 may be swapped using a recharging station or a transporting apparatus (shown in FIG. 17). Power container 1 may include in-line wheels 2 configured for running on rails 3. Locking latches 13, 13B rise, by pivoting about axles 129, in order the release power container 1 to roll sideways in either direction during swapping operation. Locking latch 13B may be similar to locking latch 13, with the additional function of establishing an electrical connection with power container 1 to convey power to a controller (not shown) of the electric vehicle, through flexible cables 14. Socket 4 may be provided on at least one end of power container 1, and used by a pulling head (not shown) of the transporting vehicles of the recharging station (not shown) or transporting apparatus of FIG. 17. Socket 4 may be a DRAW-TITE™ type coupler. The pulling head may have a locksmith type latching tongues to enable and disable the coupling operation with socket 4. It should be understood that other coupling systems may be used alternatively for the same purpose, e.g., mag-locks, railway, fifth-wheel type, etc. The electric vehicle may include adjustable suspension apparatuses 7, which tension is controlled independently on each wheel by hydraulic pistons or cylinders 5, as described in further detail below. Wheel 6 is a component of an optional grounding and/or guiding system, described in further detail below.

Figure 2A:
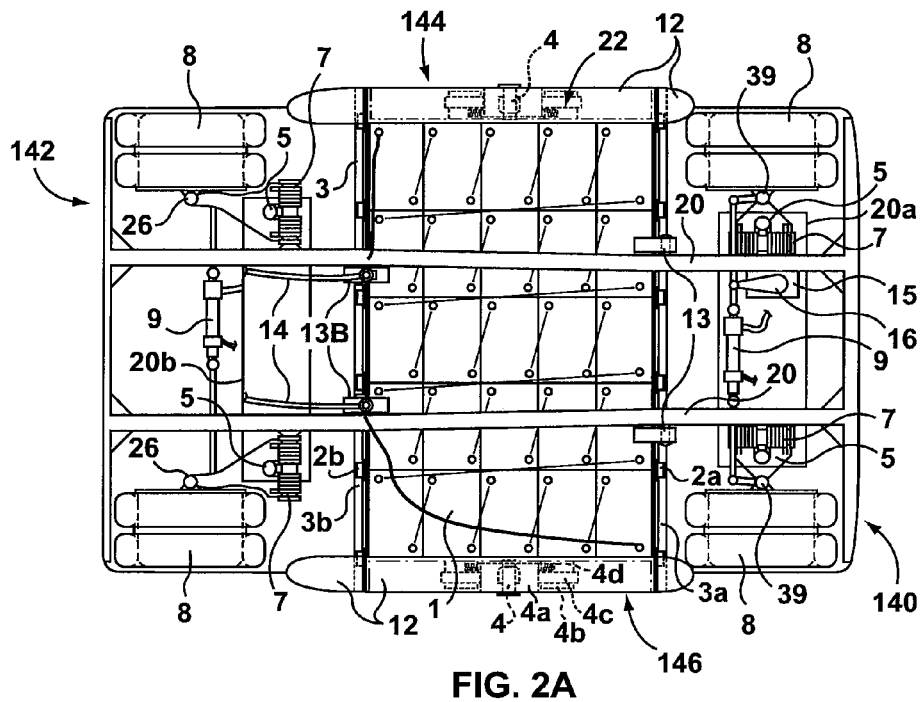
FIGS. 2B and 2C are partial upper and front views of the electric vehicle of FIG. 1, showing ground and guidance components.

FIG. 2A is an upper view of chassis 20 of the electric vehicle. Chassis 20 includes front end 140, rear end 142, left side 144 and right side 146. Compartment 22 may be arranged generally intermediate front end 140 and rear end 142 of chassis 20, so that the mass of power container 1 may be generally equally distributed between wheels 8. Twin tire wheels 8 may allow for a relatively deep brake drum, with room enough for a heavy duty braking system as well as a combination of brake hardware and electric hub motors. The electric vehicle may also have a steering system that allows it to spin around its own vertical axis, by expanding hydraulic pistons 9, driving the front wheels to rotate on knuckles 39 to converge in their front perimeter, at the same time the back ones converge on their back perimeter by rotating on knuckles 26, forming a circular track that allows the electric vehicle to spin around by making wheels 8 on one side rotate in the opposite direction of wheels 8 on the other side. Adjustable suspension apparatuses 7 may be mounted on an axle with level and tension commanded by hydraulic pistons 5. Steering box 15 controls Pitman arm 16. It should be understood that steering box 15 and Pitman arm 16 may be replaced by a "rack-and-pinion" system with expanding cylinder 9 placed in between one of the inner rods, or alternatively with another suitable steering system, including an electric steering system.

In the illustrated example, compartment 22 includes forward rail 3a and rearward rail 3b transversely extending between left side 144 and right side 146 of chassis 20. Power container 1 include first in-line wheels 2a arranged at to run along forward rail 3a, and second in-line wheels 2b arranged to run along rearward rail 3b, permitting rolling movement of power container 1 being inserted into or removed from compartment 22.

In the illustrated example, steps 12 may be used by the driver and passengers whenever entering or exiting the electric vehicle. Locking latches 13, 13B serve to prevent power container 1 from transverse movement relative to the electric vehicle to selectively maintain the power container 1 within compartment 22. Locking latches 13, 13B may be pivotally coupled to chassis 20, each movable between a locked, engaged position in which locking latches 13, 13B prevent power container 1 from transverse movement relative to the electric vehicle, and a raised, released position in which locking latches 13, 13B are disengaged from power container 1 and the power container 1 may be inserted or removed from compartment 22. Locking latches 13, 13B may be lifted and released before each swapping operation, and back to resting (lock) positions afterward. Locking latch 13B is the rear locking mechanism that also serves as a connector from the + and − terminals of power container 1 to cables 14, which conveys the electricity to the controller module of the vehicle (not shown) and subsequently to the electric motor(s) (not shown).

Chassis 20 may support the whole vehicle. Chassis 20 may include one or more cross-members (not shown) as and where necessary. Optional reinforcing rods (not shown) may be installed running from chassis 20 to various parts of supporting rails 3a, 3b, if necessary, to secure the integrity of rails 3a, 3b during a bumpy ride. Sturdy plates 20a, 20b may serve as supports for hydraulic cylinders 5, operable to control the suspension of the electric vehicle, as well as cross members of chassis 20. Plates 20a, 20b may be oriented generally horizontally and may extend generally towards the outer edges of the electric vehicle. Plates 20a, 20b may function as an anchor structure for various bolts, latches, nuts, etc., that may be used to secure the cabin to chassis 20. One or more similar additional plates (not shown) may be arranged between plates 20a, 20b and on top of chassis 20 to further secure the cabin to chassis 20.

Rotary segment 4a of socket 4 holds plate 4e (FIG. 3A) for use with optional magnetic locking systems (not shown) for inserting or removing power container 1. Rotary segment 4a rotates around axles 4c, which are secured by bushings 4b attached to power container 1. Click locking steel ball 4d may engage and retain rotary segment 4a in a preselected position between switching operations.

Figure 2B:
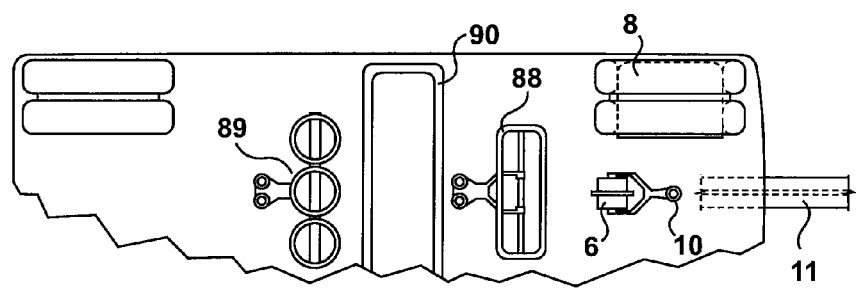
Figure 2C:
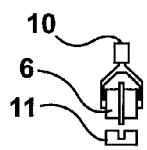

FIGS. 2B and 2C are partial lower and end views of the electric vehicle showing some options of hardware to pick up energy from wire embedded dedicated highway lanes, as well as to provide autopilot guidance for the vehicle. Securing pin 10 of the optional electrical ground contact wheel 6 allows swiveling in synchrony with the steering movement of the front wheels 8. This device may be used also to physically guide an auto-pilot system that may drive the electric vehicle at any speed following the path of the ground embedded rail 11. Contact wheel 6 may bear downwardly due to its own weight, or may include a tensioning spring mechanism and be configured to be retracted when not in use. Contact wheel 6 may be replaced alternatively by a wireless system as shown as 88 with sensors arranged on a coil, or instead, a metal detector type with two or more coils 89 to improve the findings of the guiding rail or any other ground embedded hardware to be transmitted to the steering system of the vehicle in order to allow hands-free driving. Another coil 90 may also serve as energy pick up from live wiring embedded under the pavement, transferred to the onboard controller/power management and then distributed to the motors and/or battery charger. Coils 88, 89, 90 may cover part or the whole width of the electric vehicle. The guiding and/or ground connection provider rail 11 may also be replaced by a wire rope or any metal rod embedded on the highway path either solid or intermittently to work as guide for the electronic sensor(s) connected to the steering mechanism. Spikes or any other device with or without integrated electronic sensors may also optionally replace them.

FIG. 3A is a perspective view of power container 1. Power container 1 may include front sidewall 150, rear sidewall 152, left sidewall 154 and right sidewall 156. In some examples, power container 1 may be filled with a plurality of batteries interconnected in parallel, series, or a combination thereof. In some particular examples, power container 1 may be filled with a plurality of lead-acid batteries interconnected in parallel, series, or a combination thereof. In other examples, power container 1 may house a fuel cell stack, or super capacitors. It should be understood that power container 1 may be made according to other configurations to satisfy the specifications of other power generating/storage equipment, either used in tandem with or in place of lead-acid batteries.

Wheels (or bearings) 2a, 2b may be flanged (on either side or both), running on rails 3a, 3b, which may be reinforced by cross members 122. Loops 137 are secured along outer surfaces of rails 3a, 3b to host supporting rods (which may be with or without threaded tensioners, and may be placed at an angle) extending down from chassis 20 (FIG. 2) of the electric vehicle. Loops 137 may be spaced along rails 3a, 3b, and may be used for securing the rails 3a, 3b when installed inside automated swapping station, e.g., bolted or otherwise anchored to the ground, to pillars, fixtures, brackets, elevators, ramps, transporting trolleys, etc. Grooves 124 of front sidewall 150 may be configured for engagement with locking latch 13 (FIG. 2), and serve to prevent lateral sideways movement of the power container 1. Grooves 125 of rear sidewall 152 may be similar to grooves 124, with the added function of providing electrical contact between the circuitry of power container 1 and flexible cables 14 (FIG. 2).

Figure 17:
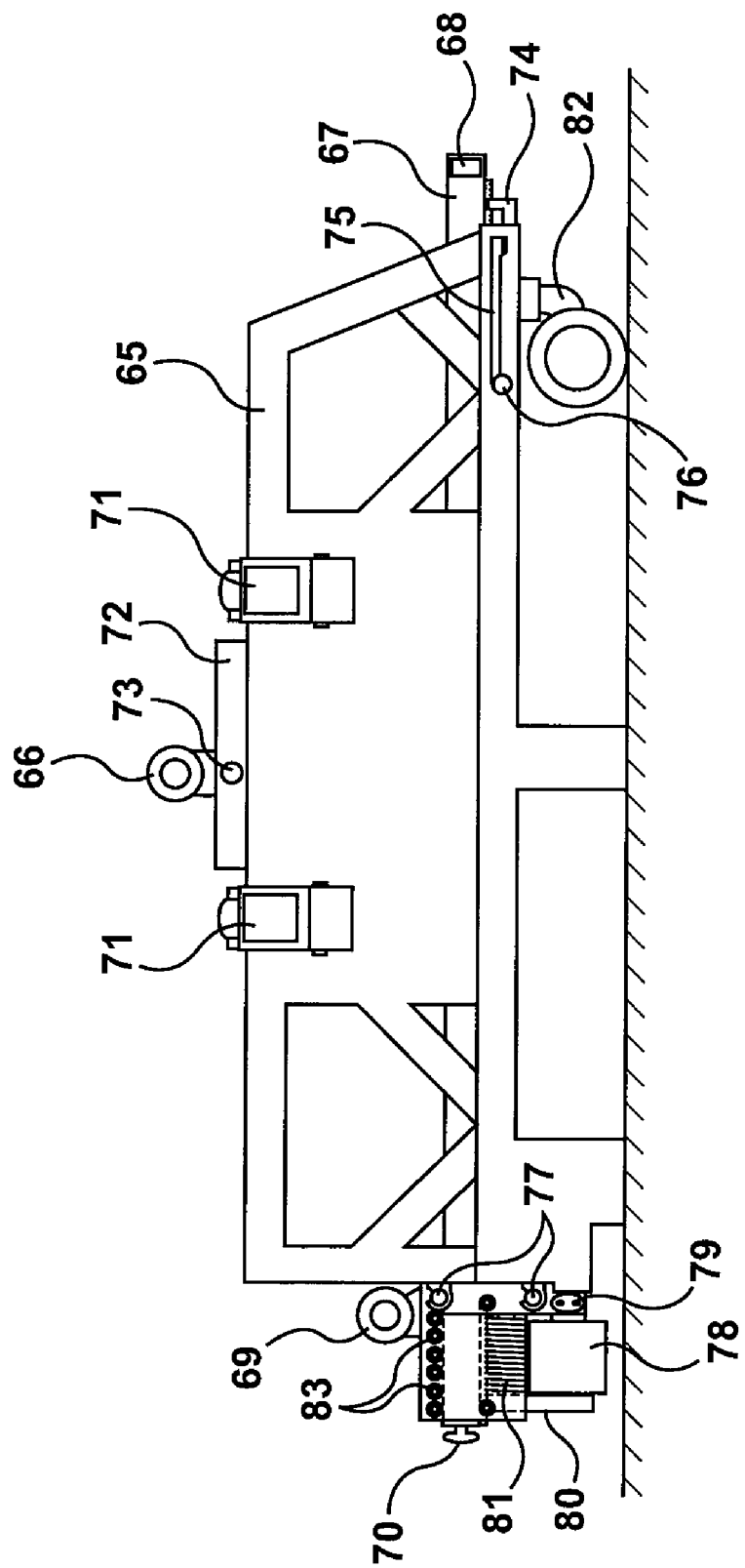
FIG. 17 shows a transporting apparatus for providing roadside assistance to the electric vehicle of FIG. 1.

Referring to FIGS. 3B and 3C, locking latch 13B is configured to rotate around semi-axles 129, which may be installed through orifices 130 of block 131 and plate 132 of support bracket (FIG. 3C) and firmly bolted together by bolts 133, which may travel all the way into the chassis 20 (FIG. 2), or just into the block 131. U-shaped plate 134 may be formed of copper (or another conductive metal), which physically contacts surface 136, which may be attached to electrical post 127 in the same manner that plate 134 is connected to post 128. The structural walls surrounding these connectors may be made of a non-conductive material, or suitably insulated, as it may be a high voltage environment. In case of power failure, tab 135 may enable the upward (releasing) movement of locking latch 13B, either by hand or another appropriate tool. The functions of locking latch 13B may be made electrically by installing a device configured to rotate semi-axle 129, with a motor (e.g., a toggle-action device similar to automotive power lock systems), or hydraulically, by compressed air, etc. Socket 4 may be provided on left sidewall 154, right sidewall 156, or both. Socket 4, as mentioned above, may be configured to be penetrated by the head of the pulling shaft of at an automated recharging station, or shaft 67 of transporting apparatus of FIG. 17. Cavity 123 may host locksmith-type "click" latches 68 (FIG. 17). Two or more latches may be installed on the upper and/or lower surfaces of socket 4, which may be made in another shape also (e.g., round, triangular, hexagonal, etc.). As described above, rotary segment 4a may also be provided as an additional coupling option for the mobility of power container 1.

Figure 3D:
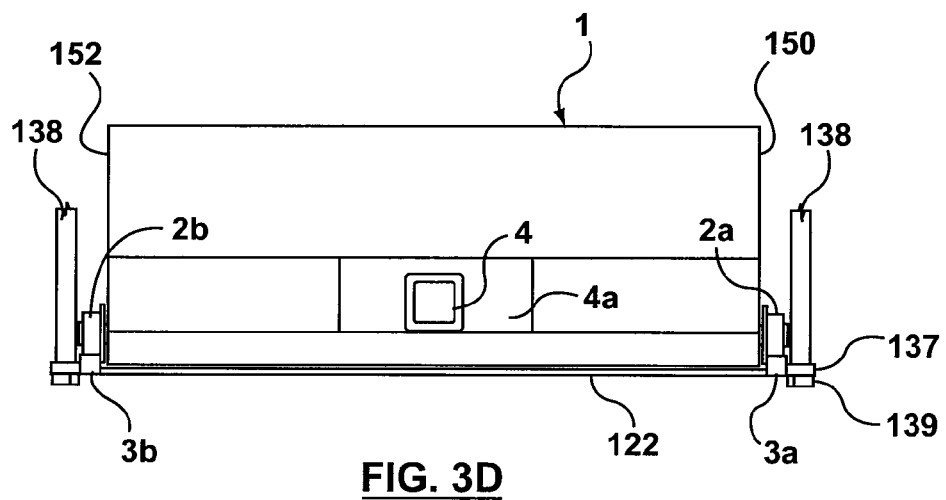
FIG. 3D is a side view of the power container of FIG. 3A.

Referring to FIG. 3D, power container 1 fits inside the electric vehicle, with wheels 2a, 2b running respectively on rails 3a, 3b spaced apart by cross member 122 and supported at edges by hanging rods 138. Hanging rods 138 connect through brackets 137, and may be retained by nuts 139. Again, socket 4 may be configured to be penetrated by the head of the pulling shaft at an automated recharging station, or shaft 67 of transporting apparatus of FIG. 17.

Figure 3E:
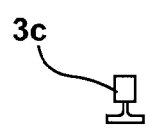
FIG. 3E is a profile view of another railing for supporting the power container of FIG. 3A.

Referring to FIG. 3E, rails 3c may be laid out to provide for traveling distances of power container 1 along the ground, separate from the vehicle.

Figure 4:
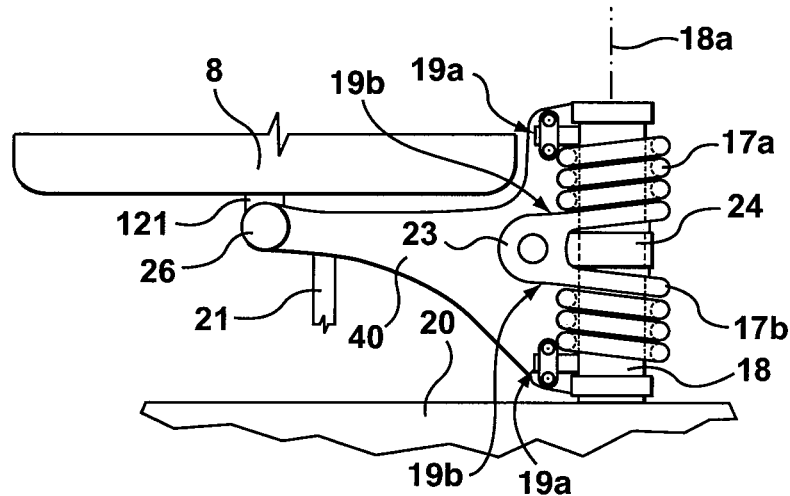
FIG. 4 is a partial upper view of a suspension apparatus for rear wheels of the electric vehicle of FIG. 1.

Referring to FIG. 4, rear left wheel 8 spins around semi-axle 121, which is attached to chassis 20 with control arm 40 of a suspension apparatus that may be associated with rear wheels of the electric vehicle. Shaft 18 is mounted to chassis 20 and extends lengthwise along shaft axis 18a, which may be generally horizontal.

Figure 5:
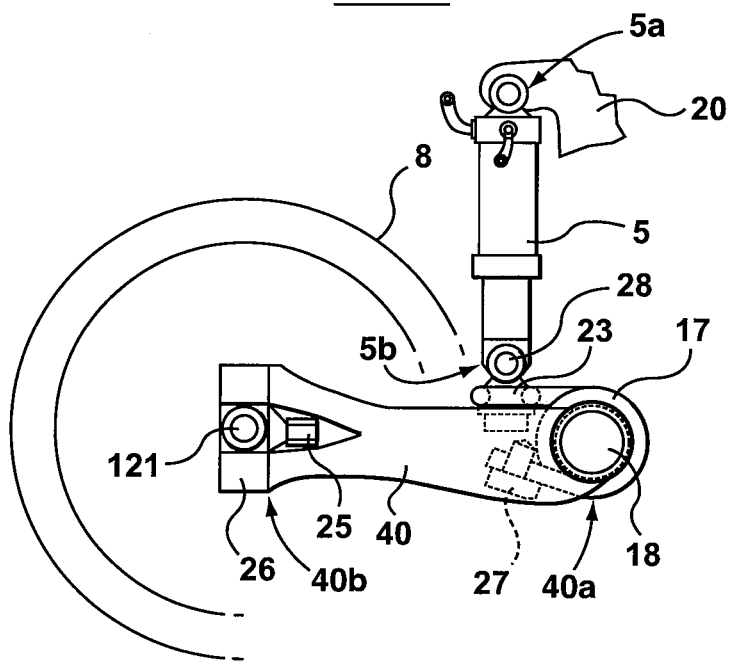
FIG. 5 is a partial side view of the suspension apparatus of FIG. 4.

Referring to FIGS. 4 and 5, control arm 40 includes first arm end 40a pivotably connected to shaft 18 so that control arm is pivotable generally about shaft axis 18a. Control arm 40 may be connected to shaft 18 at first and second connection points on opposing sides of sleeve 24, adjacent to first spring ends 19a of springs 17a, 17b that are fixed to control arm 40. Control arm 40 includes second arm end 40b spaced apart from shaft 18. Wheel 8 is mounted to second arm end 40b.

Rear wheels 8 may have a steering-like articulation for the electric vehicle to spin around its own axis, by moving tie rod 21 outwards around knuckles 26. Terminal 25 of tie-rod 21 is coupled to wheel 8 to enable steering.

Springs 17a, 17b in the form of helical coil springs are mounted on shaft 18 and are disposed generally around shaft axis 18a. In the illustrated example, springs 17a, 17b are an integral component. Springs 17a, 17b each include first spring ends 19a connected to control arm 40 by securing brackets fixed to end mounts 27, and second spring ends 19b spaced apart along shaft 18 from the respective first spring end 19a. Second spring ends 19b terminate at loop 23, which may be connected to sleeve 24 and articulating assembly 28. Springs 17a, 17b are guided by sleeve 24 and extensions 24A (FIGS. 6 and 7), so that springs 17a, 17b may be radially spaced apart from shaft axis 18a and not touching shaft 18.

FIG. 5 shows a linear actuator in the form of hydraulic cylinder 5 having a first end 5a mounted to chassis 20, and second end 5b pivotally connected to second spring ends 19b of springs 17a, 17b by articulating assembly 28.

Movement of hydraulic cylinder 5 controls control arm 40 by, for example, increasing bending stress on springs 17a, 17b and consequently urging second arm end 40b downwardly, which, in the illustrated example, can increase ground clearance of the electric vehicle. In the illustrated example, hydraulic cylinder 5 extends or retracts to respectively increase or decrease the bending stress on springs 17a, 17b.

Figure 6:
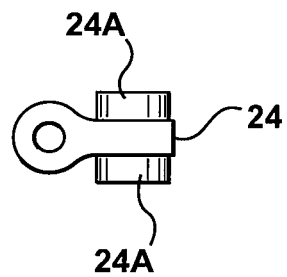
FIGS. 6 and 7 are an upper view and a side view, respectively of a spring guide sleeve mounted on a shaft of the suspension apparatus of FIG. 4.
Figure 7:
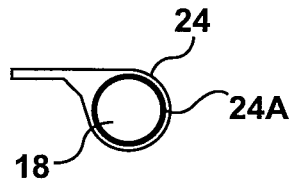

FIG. 6 shows sleeve 24 and extensions 24A. FIG. 7 shows sleeve 24 and extension portions 24A configured to rotate around shaft 18, in accordance with movement of hydraulic cylinder 5.

FIG. 8 shows upper and lower control arms 30, 40 of a suspension apparatus that may be associated with right, front wheels of the electric vehicle. Control arms 30, 40 may be firmly secured to chassis 20, with a similar spring arrangement to that of the suspension apparatus associated with rear wheels as described above. Control arms 30, 40 may be controlled by hydraulic cylinder 5, with fluid intake 29 and fluid return 29A. Upper control arm 30 and lower control arm 40 may be both secured to steering knuckle 39. Semi-axle 32 is mounted to steering knuckle 39, and front wheel (not shown) is mounted to semi-axle 32. Needle 106 is configured to communicate with electronic sensor ruler 107, which slides up or down according to the dynamic forces of the ride, which are compensated by the commands of sensor of FIG. 9 through control valves of FIG. 9A and in synchrony with selective ground clearance selector interface located on the driver's dashboard (not shown).

FIG. 9 shows an assembly of sensors that determines an amount of hydraulic fluid to flow to expand or retract hydraulic cylinder 5 in order to compensate for dynamic forces acting on each of the four wheels when the vehicle is in motion. Pendulum weight 34 is hung by flexible cable 33, and expanding spring 94 is secured at bolt 92. Pressure may be sent, for example, to the right wheels of the electric vehicle when pendulum weight 34 is leaning to the right and subsequently moving sensor needle 36, which pivots about axle 98 and is supported by mount 93 to the right of dial 103, which opens valves 108 to send fluid to FR (front right) and RR (rear right) wheels (FIG. 9A). In an opposite example, pressure may be sent to the left wheels of the electric vehicle when pendulum weight 34 is leaning to the left and subsequently moving sensor needle 37, which in turn opens valves 108 to send fluid to FL (front left) and RL (rear left) wheels (FIG. 9A). Similarly, sensor needle 35 controls fluid to the rear wheels (RR and RL), and another sensor needle (not shown) controls fluid to the front wheels (FR and FL). In this manner, hydraulic cylinders 5 may be controllable generally in real time to compensate for dynamic forces acting on each of the four wheels of the electric vehicle.

Fluid returns 29a operate to place cylinders 5 in their rest position, which may be dictated by a selected level determined by the controller device installed on the electric vehicle's dashboard. Optional retracting spring 38 may help to prevent weight oscillations, as well as work as a stopper when fully compressed. Dials 103 may be wired (not shown) to communicate with flow control module of FIG. 9A. Needle 99 travels upwards when mouth 95 engages rod 96 downwardly. When pendulum weight 34 hangs downwardly in a centralized position, tension of the suspension apparatuses of all four wheels may be increased, otherwise tension is directed to specific wheel(s). In case the pendulum is forced to go further down, stopper 100 moves centering washer 101 downwardly, which pivots rod 102 and causes mouth 97 to move upwardly and needle 105 downwardly, commanding, at the very end of its traveling range, a brief opening and closing of all valves 108 of return tubes 29A of FIG. 9A, in order to neutralize an undesirable bouncing effect of the electric vehicle (after hitting a pothole or a bump in the road). Expanding coil springs 104 ensure that rods 102 return to their resting position.

FIG. 9A is the hydraulic flow control module of the electric vehicle showing fluid intake and returns 29, 29A that cause hydraulic cylinders 5 of each wheel to expand or retract. Flow control valves 108 may be monitored electrically or electronically by sensors of FIG. 9 (wiring not shown). A hydraulic pump (not shown) is provided to flow fluid from one of the ends of the fluid intake 29 through to the other end of the module to expand each hydraulic cylinder 5 of the four wheels. Fluid returns 29A may be used to return the fluid to a reservoir (not shown), moving in opposite direction to that of hydraulic cylinders 5, and in this case moved by gravity.

Figure 10:
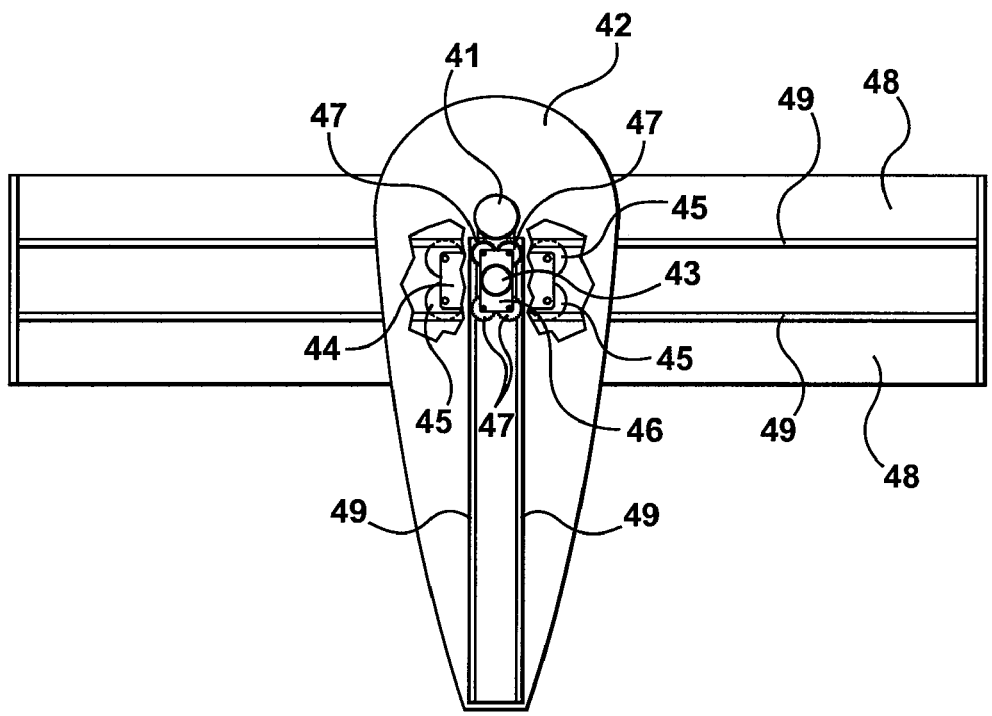
FIG. 10 is a front view of a progressive ratio steering apparatus of the electric vehicle of FIG. 1.

FIG. 10 is a front view of a steering apparatus which alters the ratio of movement of steering of the front wheels in a progressive manner as the driver commands the interface towards either the right or the left sides. The steering apparatus may be implemented with an advanced system that puts all commands of the electric vehicle in one place (including, for example, gearshift, HVAC, turn signals, flashers, wipers, washers, brakes and accelerator, infotainment, GPS mapping, video communication, "blind spot" back view monitoring, cell phone audio and texting, etc.), and viewed, for example, in a full LED screen right in front of the driver, and without the obstruction caused by a traditional steering wheel. The system may encourage drivers to keep both hands in command of the electric vehicle even during intricate maneuverings, and their eyes on the road ahead and on the monitor at all times, also when backing up. In some examples, features less essential to driving may be automatically deactivated once the electric vehicle reaches a speed of about 10 mph.

Figure 12:
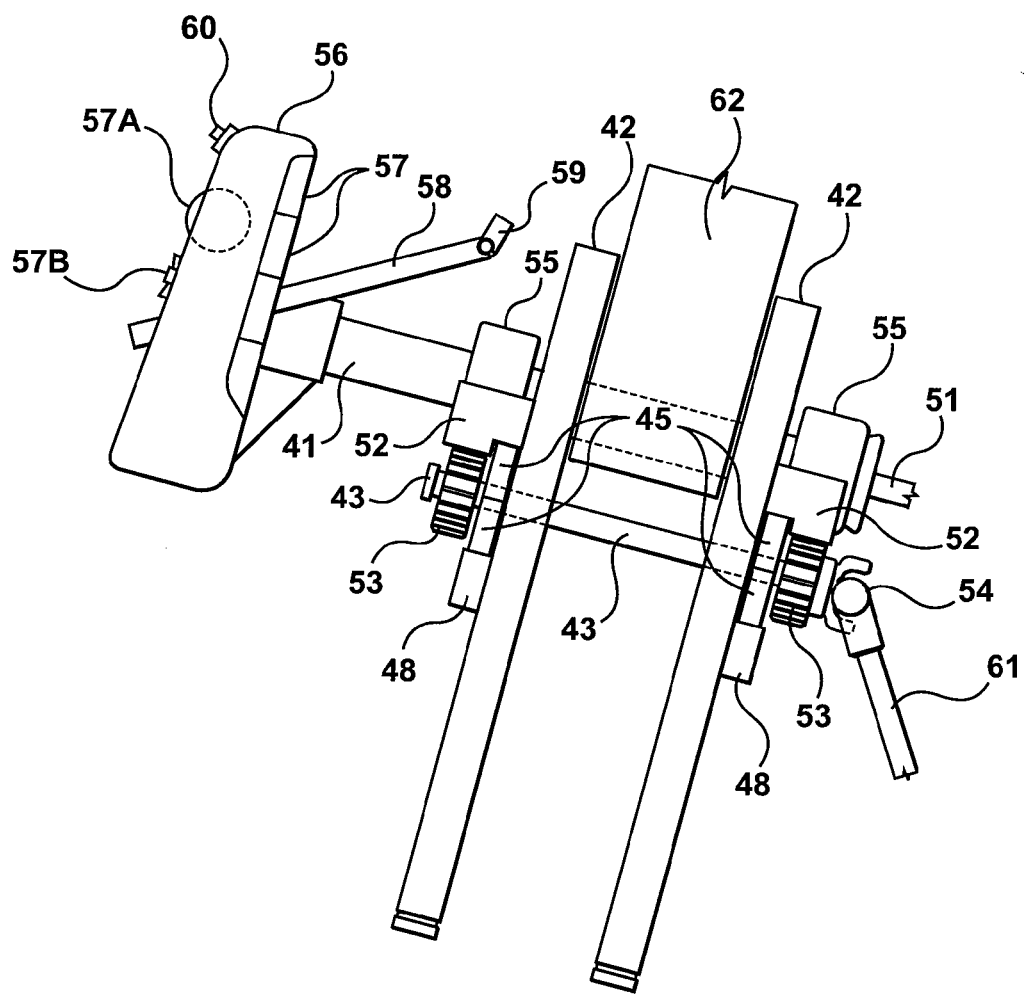
FIG. 12 is a side view of a steering interface for use with the progressive ratio steering apparatus of FIG. 10.

Referring to FIG. 10, steering command shaft 41 is attached to long open wrench 42 and is driven by interface 56 of FIG. 12. Swing shaft 43 moves to either horizontal direction guided by sliding gear assembly 44 holding gears 45. Gears 45 run horizontally on railing 48 within channels 49, in synchrony with assembly 46 with gears 47, which run vertically within channels 49 of the long open wrench 42. This mechanism may provide a conventional steering ratio "feeling" when its interface is in the center (e.g., at highway speed), and more precise steering of the electric vehicle when the yoke is moved away from the center point, or whenever the electric vehicle is traveling at slower speeds. The setup for a zero turning radius may be activated by turning the yoke all the way either to the right or to the left, and only when the vehicle is at a complete stop.

Figure 11:
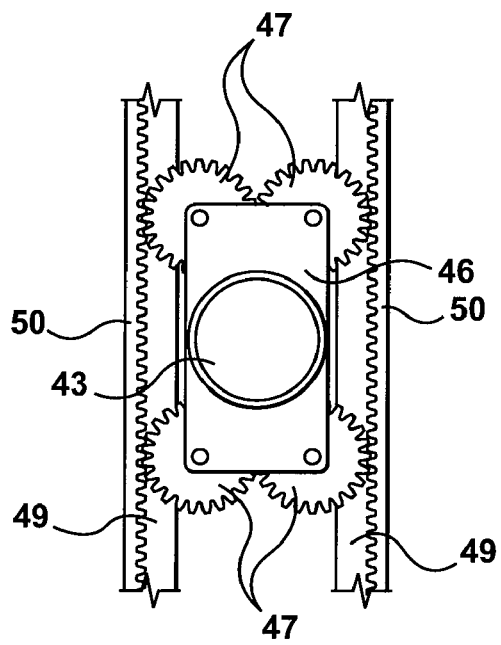
FIG. 11 is a detailed view of the progressive ratio steering apparatus of FIG. 10, showing a sliding assembly.

FIG. 11 is a detailed view showing gears 47 of assembly 46 traveling on rack 50 within vertical channel 49, which guide movement of assembly 46 in synchrony with the movements of shaft 43. Sliding gear assembly 44 (FIG. 10) may have a similar configuration as assembly 46 of FIG. 11, but may be of different size and may function generally horizontally instead of generally vertically.

FIG. 12 is a side view of the progressive ratio steering apparatus, showing steering interface 56. Buttons 57A, 57B may be similar to mouse buttons and scroll wheel, plus additional buttons for control of the electric vehicle and input to its computer. Cursor driver 60 may be a track-ball, touch pad, etc. Keyboard 58 may be a full QWERTY alphanumerical keyboard. Adjustable pad 59 may contain a camera and microphone(s). External computers (not shown) may be docked to the system of the electric vehicle to work solo or together with the system of the electric vehicle. Steering command shaft 41 extends to steering interface 56. Long open wrench 42 pivots sideways about swing shaft 43. Snake 51 contains wiring going to steering interface 56. Gears 53 engage teethed ruler 52 for driving steering command shaft 61 through U-joint 54 to the steering assembly connected to the front wheels of the electric vehicle. There may be an extra slide-sleeve mechanism (not shown) for compensating length differences of shaft 61 where it approaches the steering box, rack-and-pinion or any other kind of steering mechanism. The system may be secured by block 62, with additional help of horizontal bars 55 and attached to brackets (if any) of the dashboard mount of the electric vehicle. An airbag system (not shown) may be installed around or underneath steering interface 56, just under keyboard 58, and may be configured to push keyboard 58 upwards and out of the way in case of deployment of the airbag.

Figure 12A:
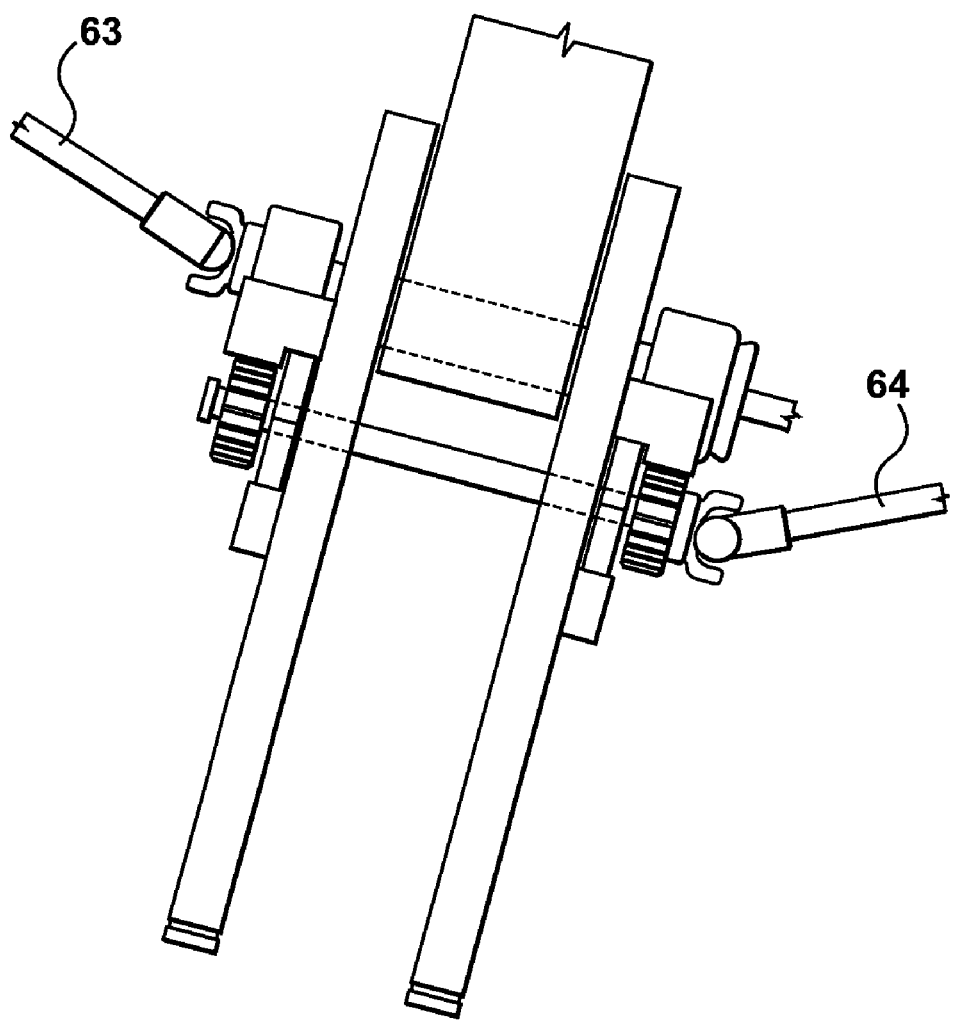
FIG. 12A is a side view of a steering interface for use with the progressive ratio steering apparatus of FIG. 10 for installation in the chassis of the electric vehicle.

FIG. 12A shows a similar apparatus to that of FIG. 12, which may be installed in a chassis of an electric vehicle, where the steering interface commands shaft 63. Shaft 64 is attached to the mechanism which steers the wheels. This system may improve driver's safety on frontal collisions, and may increase available interior space. It should be understood that this steering apparatus may alternatively command an electronic module that controls functions of a "by-wire" steering system. The screen monitor described herein mentioned may be attached to steering interface 56, and the whole assembly may be installed on the right side of the cabin in right-hand drive versions of the electric vehicle, for operation in left-hand traffic countries.

Figure 13:
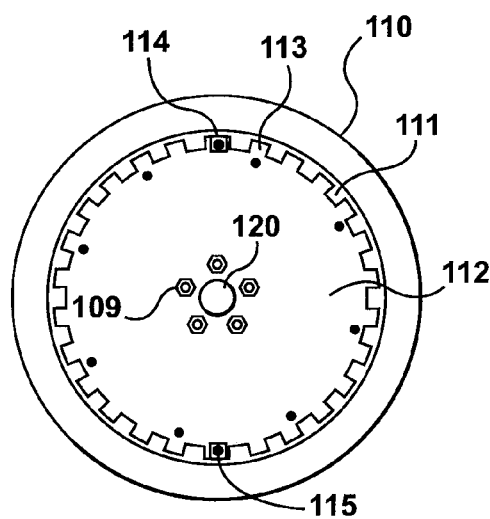
FIG. 13 is a side view of a wheel of the electric vehicle of FIG. 1, shown without a covering hub cap.

FIG. 13 is a side view a wheel having twin tire 110, tire rim 111 and wheel rim 112. Grease cap 120 covers the hexagonal nut and cotter pin that may hold the wheel, and tightened by nuts 109 onto bolts of an axle assembly (not shown). Tapped holes 113 received bolts to firmly secure hubcab 119 (FIG. 14) to wheel rim 112. Inner tire valve 114 is spaced apart from outer tire valve 115.

Figure 14:
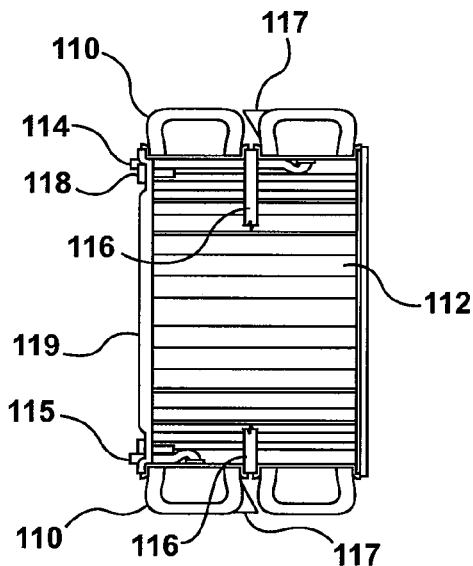
FIG. 14 is a cutaway profile view of the wheel of FIG. 13, showing twin tires.

FIG. 14 is a cutaway profile view of the wheel showing twin tire 110 mounted on wheel rim 112. Tire rim 111 may be transversely dented at its inner diameter surface engaging wheel rim 112, and flanged outwards at its edges to hold the beads of each of the twin tires 110 and to be securely fixed to wheel rim 112. Inner edges of twin tire rims 111 may be separated by element 116 installed onto wheel rim 112. The dented engagements may be shaped in various configurations as long as wheel rims 112 and tire rims 111 do not slip inside one other under any circumstances. Lugs 117 of side portions of twin tire 110 may be intercalated to increase grip of the wheel and improve appearance of twin tires 110, which may appear similar to a modern wide body, low profile single tire.

Figure 15:
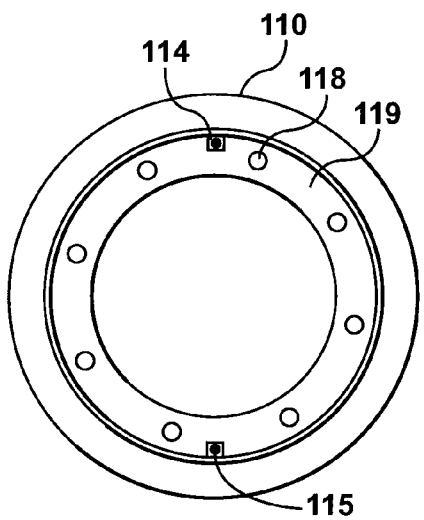
FIG. 15 is a side view of the wheel of FIG. 13, shown with a covering hub cap.
Figure 16:
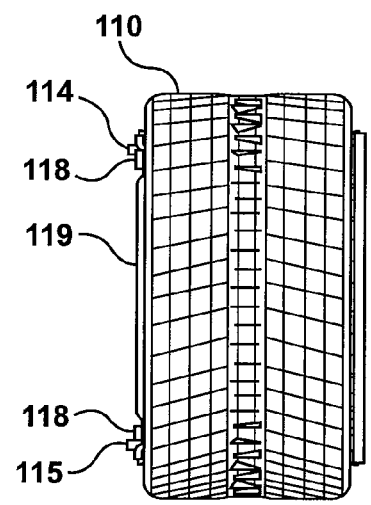
FIG. 16 is a profile view of the wheel of FIG. 15.

FIGS. 15 and 16 are views of the wheel with tire 110 and hubcap 119 on. Hubcap 119 is secured by bolts 118. Hubcap 119 may be solid as shown, or perforated in order to provide ventilation to braking hardware.

FIG. 17 shows a transporting apparatus for roadside assistance, which may be used to dispense and collect power containers. The apparatus includes chassis 65, which may be hoisted by loop 66. When docked beside an electric vehicle, the vehicle's rails (e.g., rails 3a, 3b shown in FIG. 3A) may be aligned with the transporting apparatus. Shaft 67 having latches 68 is used to engage the vehicle's socket (e.g., socket 4 shown in FIG. 3a) located along the side of the power container. Knob 70 may manually control opening and closing of latches 68. Locking latches 71 may prevent the power container from moving sideways during transportation, performing the same general function as locking latches 13, 13B of the electric vehicle. Channeled support plate 72 holds loop 66, allowing it to slide sideways and locked in a desired position by a spring mechanism commanded by knob 73, thus providing a means for controlling the degree of inclination of the apparatus. Sliding hook 74 is used to help align the apparatus's rails to the vehicle's, and is configured to slide back and forth by knob 76 traveling in slot 75. A retraction/extension shaft and motor assembly includes electric motor 78 powered by cables (not shown) plugged into socket 79. Anchoring pins 77 secure the retraction/extension motor assembly to hooks attached to the frame of chassis 65. The retraction/extension motor assembly may be detached from the rest of the apparatus by hoisting loop 69. Electric motor 78 turns pulleys (not shown) inside casing 80, which rotates spirally grooved cylinder 81. Grooved cylinder 81 is engaged to corresponding grooves of shaft 67, so that shaft 67 horizontally translates and is guided by upper and lower rollers 83, in order to either retract or extend a power container traveling inside the apparatus. Other guide rollers (not shown) support shaft 67 across the apparatus. Front casters 82 may help to fine tune alignment of the rails in order to finalize the docking operation. It should be understood that the mechanism controlling the translation movement of shaft 67 may be replaced alternatively by a hydraulic system or another suitable system.

Figure 18:
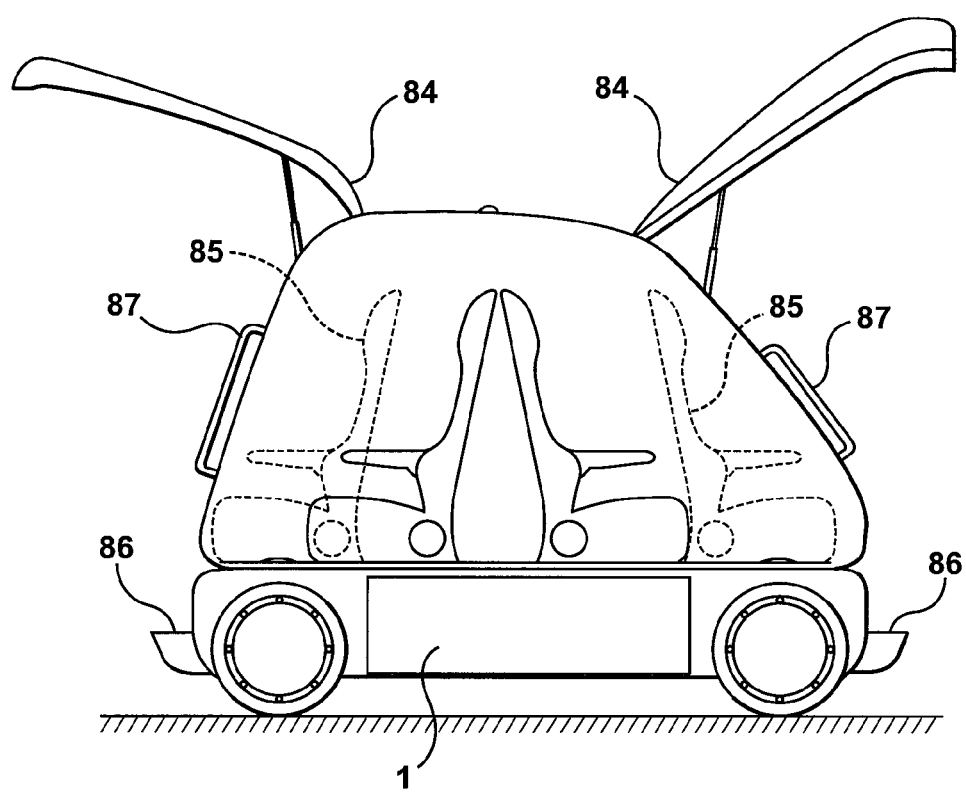
FIG. 18 is a partial side view of another electric vehicle.

FIG. 18 shows an electric vehicle that may be suitable for transit applications in which electric vehicles operate in convoys, and may be interconnected wirelessly by electronic sensors. The electric vehicle may have advantages when compared to larger transit vehicles, in terms of economy of acquisition, maintenance and operation, versatility of use, noise and emission of pollutants, physical size, maneuverability, and passenger access, as passengers may enter or exit multiple units all at the same time, thus reducing likelihood of unpleasant lineups and bottle necks at the doors. As described above, the electric vehicle may include power container 1, which may be covered by optional "gull wing" side lids. Front and rear gates 84 provide access to the cabin of the electric vehicle. There may be about six seats 85, for example, each of which may be moveable within the cabin to position a requesting passenger closer to respective gate 84. Exiting passengers may step on step support 86 and grasp stanchion 87, both of which may be configured to retract automatically as gate 84 closes, returning to extended positions immediately after opening of gates 84.

Figure 19:
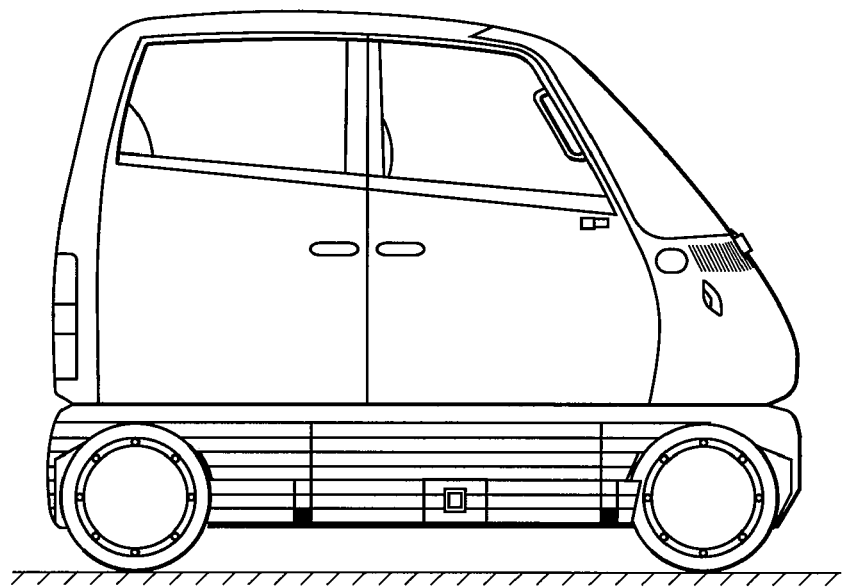
FIGS. 19, 20 and 21 are a side view, a front view and a rear view, respectively, of the electric vehicle of FIG. 1.
Figure 20:
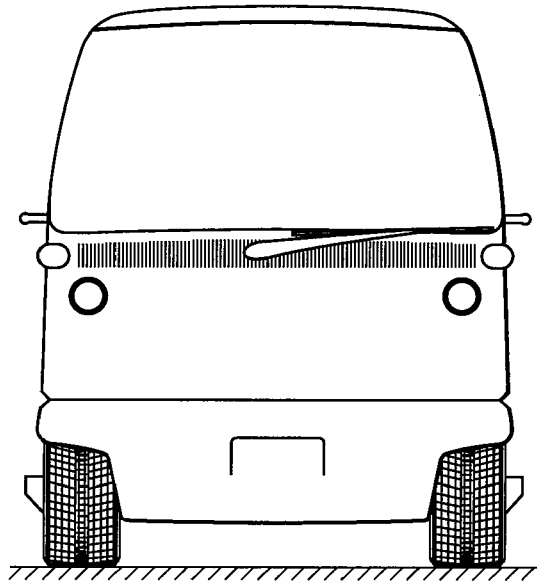
Figure 21:
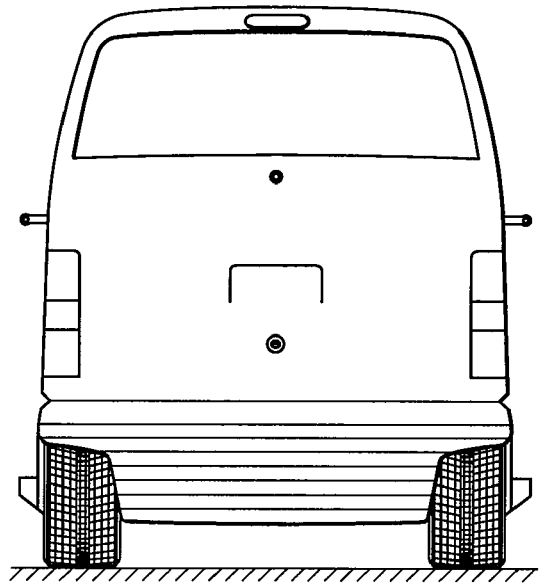

FIGS. 19, 20 and 21 are further views of the electric vehicle shown in FIG. 18, according to a version which may be suitable for use as a "crossover" automobile.

As described herein, electric vehicles including the swappable power container may have a generally unlimited operating range, and the potential of being retailed at a competitive price, and may include several features and advantages over existing automobiles.

Using advanced lead-acid batteries in the power container, electric vehicles may have a maximum speed of about 80 mph (128 km/h) and a range of approximately 75 miles (120 km). Use of lithium batteries may increase the range to about 130 miles, but may increase cost. As described herein, a depleted power container may be swapped for a charged one in a matter of seconds at a dedicated charging station. Remotely, a depleted power container may be swapped with freshly charged power container using the transporting apparatus.

Electric vehicles as described herein may be configured for traveling wirelessly on a dedicated highway lane or a "dual mode" highway, even without carrying batteries or other onboard energy storage/generating device, and additionally having its batteries recharged (if any).

Electric vehicles as described herein may measure only 8 feet in length may be able to accommodate five adults comfortably, and the ability to spin around its own vertical axis means maneuverability and thus flexibility in parking.

Electric vehicles as described herein may feature relatively simple architecture, with basic parts that may be transported in conventional trailers or maritime containers, and assembled at the dealership or a chain store with adequately sized service bays. For example, it may be possible to fit an average of about 55 semi-assembled vehicles as illustrated in FIG. 18 into an 8'×10'×53' trailer, about 45 into an 8'×9'×53' trailer and about 36 inside a 40' maritime container. This may reduce the need for assembly plants scattered in remote locations, dealership costs, large stock parking lots, and car transporter trailers that typically are capable of carrying only nine vehicles.

Electric vehicles as described herein may be friendly to handicap drivers and passengers, by including a relatively flat floor, a remote controlled rear gate and a retractable ramp. The suspension may be lowered to the ground, and a ramp may be set up from the sidewalk to the back of the electric vehicle, parked perpendicular to the sidewalk.

Electric vehicles as described herein may include a driving interface that provides for full command of the vehicle plus various input devices, including a QWERTY keyboard and infotainment controls, at the driver's fingertips. Pedals are optional. Progressive steering may provide for lock-to-lock steering with only half a turn of the driving interface, as opposed to three turns plus on a conventional steering wheel. A display screen (not shown), which may be attached to the driving interface, may replace dashboard gauges, showing also infotainment plus rear and side view images from cameras, which may replace rear and side view mirrors.

Electric vehicles as described herein may be capable of modular upgrading, for example, changing the cabin over the chassis. Electric vehicles may have front and rear gates instead of side doors, carrying four to six or more passengers, which on a convoy basis may be utilized as a transit system operated by wireless telematics. In the same manner, electric vehicles may take the form of a minitruck, a van, a towing rig, a combination of a cabin over two or more chassis, etc.

Electric vehicles as described herein may include suspension apparatuses that are self-adjustable as well as providing for selective ground clearance, which may be used in place of parking brakes (e.g., the entire electric vehicle may be lowered until the chassis contacts the ground or sits on top of all wheels. Raising the ground clearance may also improve the ride in snow conditions. Sensors monitoring hydraulic pistons of the suspension apparatuses may be placed on each wheel in order to correct dynamic distortions of the ride, as well as taking over shock absorbers and stabilizing bars antisway and anti-roll functions, respectively, and may provide for a relatively smooth and quiet ride.

Electric vehicles as described herein may not include a spare tire, jack or tire pressure sensors onboard. Wheels with twin tires may allow for continued driving even when one of the tires is flat. It may also be possible to utilize solid tires, as the suspension apparatus is effective at insulating the cabin from the bumps in the road. Relatively wide wheels and low profile twin tires may provide for extra grip on snow and ice, and there may be sufficient room for electric hub motors, as well as braking hardware to ensure ample stopping power. Drawbacks of unsprung weight effects, common in vehicles with electric motors installed in the hub of the wheels, may also be avoided.

Electric vehicles as described herein may be relatively easy to maintain, consisting of relatively few moving parts.

Electric vehicles as described herein may be relatively safe in collisions, as occupants are not sharing level space with components having heavy mass, which may be confined to the "basement" of the vehicle. Side collisions may be neutralized by the relatively heavy power compartment, which also makes it very difficult for the electric vehicles to roll over, as the center of gravity is close to the ground. In accidents, there may be low risk of electrocution to passengers and rescue workers, as the passenger cabin may be insulated from the batteries of the power compartment, along with the motor (s), high voltage cables and connectors. These components may be confined to the "basement" of the electric vehicle.

It should be understood that some of the teachings described herein may be applicable as OEM or aftermarket item to be used in other vehicles, whether electric or not. Conversions of conventional vehicles as well as new concepts in many segments, including trucks, buses, military vehicles, "people movers", etc., may also benefit from the teachings herein.

While the above description provides examples of one or more processes or apparatuses, it will be appreciated that other processes or apparatuses may be within the scope of the accompanying claims.

I claim:

1. An electric vehicle, comprising:
a chassis including a front end, a rear end, a left side and a right side, and a compartment defined by the chassis, the compartment accessible through the left side and the right side; and
a power container housing at least one energy storage/generating device for powering the electric vehicle, the power container insertable into the compartment of the chassis through the left side and the right side and removable from the compartment of the chassis through the left side and the right side, the power container including front and rear sidewalls, the power container defines left and right steps which protrude beyond the left and right sides of the chassis, respectively, when the power container is positioned in the compartment; and
at least first and second locking latches coupled to the chassis for selectively maintaining the power container within the compartment, the first and second locking latches arranged adjacent to the front and rear sidewalls of the power container, respectively, when the power container is positioned in the compartment, and each of the first and second locking latches being pivotable between
(i) an engaged position in which the locking latch engages the respective sidewall of the power container and inhibits transverse movement of the power container relative to the electric vehicle, and
(ii) a raised, released position in which the locking latch is clear of an upper edge of the respective sidewall and the power container is movable transversely relative to the chassis for insertion and removal of the power container with respect to the compartment.

2. The electric vehicle of claim 1, wherein the compartment comprises at least one rail to support the power container, the at least one rail transversely extending generally between the left side and the right side of the chassis, and the power container comprises a plurality of wheels configured to run on the at least one rail to permit rolling movement of the power container during installation into and removal from the compartment.

3. The electric vehicle of claim 2, wherein the at least one rail comprises a forward rail and a rearward rail, and the plurality of wheels comprises a plurality of first in-line wheels arranged at the front sidewall of the power container to run along the forward rail, and a plurality of second in-line wheels arranged at the rear sidewall of the power container to run along the rearward rail.

4. The electric vehicle of claim 3, wherein each of the pluarality of wheels is elevated relative to a bottom of the power container.

5. The electric vehicle of claim 4, wherein each of the rails comprises a running surface for engagement with the wheels that is elevated relative to a bottom of the compartment.

6. The electric vehicle of claim 3, wherein each of the plurality of wheels comprises at least one of an inner flange and an outer flange for maintaining position of the power container relative to the rails.

7. The electric vehicle of claim 1, wherein at least one of the right sidewall and the left sidewall of the power container comprises a socket for receiving a pulling shaft for use inserting or removing the power container.

8. The electric vehicle of claim 7, wherein the socket is defined by a rotary segment that is coupled to the respective sidewall of the power container by at least one axle, the rotary segment rotatable about the at least one axle between a first position in which the socket is arranged outwardly for use with the pulling shaft, and a second position in which a plate held by the rotary segment is arranged outwardly for use with a secondary pulling mechanism for inserting or removing the power container.

9. The electric vehicle of claim 8, further comprising a locking mechanism for retaining the rotary segment in a preselected position.

10. The electric vehicle of claim 7, wherein the socket comprises a cavity for hosting latches of the pulling shaft.

11. The electric vehicle of claim 1, in the engaged position, each of the locking latches engages a groove in the upper edge of the respective sidewall of the power container.

12. The electric vehicle of claim 11, wherein, in the engaged position, at least one of the first locking latch and the second locking latch establishes an electrical connection with the at least one energy storage/generating device to conduct power to the electric vehicle.

13. The electric vehicle of claim 1, wherein the compartment is arranged generally intermediate the front end and the rear end of the chassis.

14. The electric vehicle of claim 1, wherein the at least one energy storage/generating device comprises a plurality of batteries.

15. An electric vehicle, comprising:
a chassis including a front end, a rear end, a left side and a right side, and a compartment defined by the chassis, the compartment accessible through the left side and the right side; and
a power container housing at least one energy storage/generating device for powering the electric vehicle, the power container insertable into the compartment of the chassis through the left side and the right side and removable from the compartment of the chassis through the left side and the right side, the power container including front and rear sidewalls; and
at least first and second locking latches coupled to the chassis for selectively maintaining the power container within the compartment, the first and second locking latches arranged adjacent to the front and rear sidewalls of the power container, respectively, when the power container is positioned in the compartment, and each of the first and second locking latches being pivotable between
(i) an engaged position in which the locking latch engages the respective sidewall of the power container and inhibits transverse movement of the power container relative to the electric vehicle, and (ii) a raised, released position in which the locking latch is clear of an upper edge of the respective sidewall and the power container is movable transversely relative to the chassis for insertion and removal of the power container with respect to the compartment;

wherein at least one of the right sidewall and the left sidewall of the power container comprises a socket for receiving a pulling shaft for use inserting or removing the power container;

wherein the socket is defined by a rotary segment that is coupled to the respective sidewall of the power container by at least one axle, the rotary segment rotatable about the at least one axle between a first position in which the socket is arranged outwardly for use with the pulling shaft, and a second position in which a plate held by the rotary segment is arranged outwardly for use with a secondary pulling mechanism for inserting or removing the power container.

16. The electric vehicle of claim 15, further comprising a locking mechanism for retaining the rotary segment in a preselected position.

17. An electric vehicle, comprising:

a chassis including a front end, a rear end, a left side and a right side, a compartment defined by the chassis arranged generally intermediate the front end and the rear end, the compartment accessible through the left and right sides;

a forward rail and a rearward rail in the compartment extending transversely generally between the left side and the right side of the chassis;

a power container housing at least one energy storage/generating device for powering the electric vehicle, the power container including a front sidewall having first and second grooves spaced apart from one another along an upper edge thereof, a rear sidewall including third and fourth grooves spaced apart from one another along an upper edge thereof, a plurality of first wheels adjacent to the front sidewall and configured to run along the forward rail, and a plurality of second wheels adjacent to the rear sidewall and configured to run along the rearward rail; and first, second, third and fourth locking latches coupled to the chassis for selectively maintaining the power container within the compartment, wherein the power container is rollably insertable into and removable from the compartment through either of the left and right sides of the chassis, wherein the first, second, third and fourth locking latches are configured to engage the first, second, third and fourth grooves of the sidewalls, respectively, when the power container is positioned in the compartment to inhibit transverse movement of the power container relative to the compartment, and wherein each of the locking latches is configured to pivot upwardly to disengage the upper edge of the respective sidewall so that the power container is movable transversely relative to the chassis for insertion and removal of the power container with respect to the compartment;

wherein the power container defines left and right steps which protrude beyond the left and right sides of the chassis, respectively, when the power container is positioned in the compartment.

* * * * *